United States Patent
Hoffman et al.

(10) Patent No.: US 10,363,725 B2
(45) Date of Patent: Jul. 30, 2019

(54) CARD SUBSTRATE WARPAGE REDUCTION

(71) Applicant: ASSA ABLOY AB, Stockholm (SE)

(72) Inventors: Ted M. Hoffman, Eden Prairie, MN (US); Brent D. Lien, Minneapolis, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/325,767

(22) PCT Filed: Jul. 22, 2014

(86) PCT No.: PCT/US2014/047550
§ 371 (c)(1),
(2) Date: Jan. 12, 2017

(87) PCT Pub. No.: WO2016/014027
PCT Pub. Date: Jan. 28, 2016

(65) Prior Publication Data
US 2017/0165952 A1 Jun. 15, 2017

(51) Int. Cl.
*B32B 7/06* (2019.01)
*B32B 7/12* (2006.01)
(Continued)

(52) U.S. Cl.
CPC ............ *B32B 37/025* (2013.01); *B32B 7/06* (2013.01); *B32B 7/12* (2013.01); *B32B 27/10* (2013.01);
(Continued)

(58) Field of Classification Search
CPC .......... B32B 2307/748; B32B 2309/70; B32B 2425/00; B32B 2429/00; B32B 27/10;
(Continued)

(56) References Cited

U.S. PATENT DOCUMENTS

| 6,244,319 B1 | 6/2001 | Maynard et al. |
| 6,279,901 B1 | 8/2001 | Fulmer |
| (Continued) | | |

FOREIGN PATENT DOCUMENTS

| EP | 2286995 A1 | 2/2011 |
| WO | 01/32540 A1 | 5/2001 |
| (Continued) | | |

OTHER PUBLICATIONS

English translation of EP2286995.*
(Continued)

*Primary Examiner* — Sonya M Sengupta
(74) *Attorney, Agent, or Firm* — Schwegman Lundberg & Woessner, P.A.

(57) ABSTRACT

Embodiments of the invention are directed to a transfer lamination process and apparatus that reduces substrate warpage. In some embodiments, the transfer lamination process is performed using a transfer lamination device, which includes a transfer unit, a substrate rotator, and a transfer ribbon having a carrier layer and a transfer layer attached to the carrier layer. In some embodiments of the transfer lamination process, a transfer section of the transfer layer is transferred from the carrier layer to a first surface of a substrate using the transfer unit. In some embodiments of this transferring step, the transfer section is heated and pressed against the first surface of the substrate using the transfer unit, and the carrier layer is detached from the transfer section. The substrate is then inverted using the substrate rotator. At least a portion of a second surface of the substrate that is opposite the first surface is then heated using the transfer unit without transferring the transfer layer to the portion of the second surface.

19 Claims, 5 Drawing Sheets

(51) Int. Cl.
 *B44C 3/00* (2006.01)
 *B32B 27/10* (2006.01)
 *B32B 37/00* (2006.01)
 *B32B 37/06* (2006.01)
 *B32B 37/26* (2006.01)
 *B32B 38/00* (2006.01)
 *B32B 38/10* (2006.01)
 *B32B 38/18* (2006.01)

(52) U.S. Cl.
 CPC .......... *B32B 37/0015* (2013.01); *B32B 37/06* (2013.01); *B32B 38/0036* (2013.01); *B32B 38/10* (2013.01); *B32B 38/145* (2013.01); *B32B 38/18* (2013.01); *B44C 3/005* (2013.01); *B32B 2037/268* (2013.01); *B32B 2307/748* (2013.01); *B32B 2309/70* (2013.01); *B32B 2425/00* (2013.01); *B32B 2429/00* (2013.01); *Y10T 156/171* (2015.01)

(58) Field of Classification Search
 CPC ... B32B 37/0015; B32B 37/025; B32B 37/06; B32B 38/0036; B32B 38/10; B32B 38/145; B32B 38/18; B32B 7/06; B32B 7/12; B32B 2037/268; B44C 3/005; Y10T 156/171
 USPC .................................. 156/235, 249, 289, 542
 See application file for complete search history.

(56) References Cited

U.S. PATENT DOCUMENTS

| | | | |
|---|---|---|---|
| 6,352,095 | B1 | 3/2002 | Fulmer et al. |
| 7,717,632 | B2 | 5/2010 | Lien et al. |
| 7,878,505 | B2 | 2/2011 | Meier et al. |
| 8,646,770 | B2 | 2/2014 | Meier et al. |
| 9,427,993 | B2 * | 8/2016 | Rieck .................... B41J 25/312 |
| 2013/0032288 | A1 * | 2/2013 | Lien .................... B32B 37/0046 156/290 |
| 2015/0217549 | A1 * | 8/2015 | Rieck .................... B32B 37/025 156/230 |

FOREIGN PATENT DOCUMENTS

| | | |
|---|---|---|
| WO | 2008/118424 A1 | 10/2008 |
| WO | 2014022088 A1 | 2/2014 |
| WO | 2016/014027 A1 | 1/2016 |

OTHER PUBLICATIONS

English translation of WO0132540.*
English translation of WO2008118424.*
Communication pursuant to Article 94(3) EPC from corresponding European Patent Application No. 14748077.6, dated Feb. 6, 2018.
International Search Report and Written Opinion of PCT/US2014/047550, dated Mar. 20, 2015.

* cited by examiner

CARD SUBSTRATE WARPAGE REDUCTION

CROSS-REFERENCE TO RELATED APPLICATION

This Application is a Section 371 National Stage Application of International Application No. PCT/US2014/047550, filed Jul. 22, 2014 and published as WO 2016/014027 A1 on Jan. 28, 2016, in English, which is hereby incorporated by reference in its entirety.

BACKGROUND

Credentials include identification cards, driver's licenses, passports, and other documents. Such credentials are formed from credential or card substrates including paper substrates, plastic substrates, cards and other materials. Such credentials generally include printed information, such as a photo, account numbers, identification numbers, and other personal information. Credentials can also include data that is encoded in a smartcard chip, a magnetic stripe, or a barcode, for example.

Credential production devices process credential substrates by performing at least one processing step in forming a final credential product. One such process is a transfer or lamination process that transfers a material to a surface of the card substrate using a heated transfer roller of a transfer unit of the device. This process can be used to transfer an image to the surface of the card substrate and/or provide protection to the surface of the card substrate from abrasion and environmental conditions, for example.

Intermediate transfer films or transfer ribbons include a fracturable laminate or transfer layer, which is often referred to as a "thin film laminate," that can be transferred to a surface of a card substrate using the heated transfer roller. Such transfer layers are generally continuous resinous materials that have been coated onto a continuous carrier layer or backing to form a transfer ribbon. The side of the resin material that is not attached to the continuous carrier layer is generally coated with a thermal adhesive which is used to create a bond between the resin and the surface of the substrate. The transfer roller is used to thermally activate the adhesive and press the resinous material against the surface of the substrate to bond the material to the surface. The carrier layer or backing is removed to complete the lamination process.

The transfer layer may also be in the form of a print intermediate, on which an image may be printed in a reverse-image printing process. In the reverse-image printing process, a print head is registered with a transfer section of the transfer layer, and an image is printed to the transfer section using the print head. Next, the imaged transfer section is registered with the card substrate and/or the transfer roller. The transfer roller is then used to activate the adhesive of the imaged transfer section causing the imaged transfer section to bond to the surface of the card substrate. The carrier layer or backing of the overlaminate material is then removed from the bonded imaged transfer section to complete the transfer of the image to the card substrate.

The transference of the transfer layer to the surface of a card substrate generally causes the card substrate to bend such that the surface that received the transfer layer becomes concave. This is generally due to the contraction of the surface and/or the transfer layer in response to cooling. One technique for handling such warpage of the card substrate, is to pass the substrate through a device that bends the card in a manner that overcomes the warpage, such as by temporarily forcing the surface of the substrate that received the transfer layer into a convex shape.

SUMMARY

Embodiments of the invention are directed to a transfer lamination process and apparatus that reduces substrate warpage. In some embodiments, the transfer lamination process is performed using a transfer lamination device, which includes a transfer unit, a substrate rotator, and a transfer ribbon having a carrier layer and a transfer layer attached to the carrier layer. In some embodiments of the transfer lamination process, a transfer section of the transfer layer is transferred from the carrier layer to a first surface of a substrate using the transfer unit. In some embodiments of this transferring step, the transfer section is heated and pressed against the first surface of the substrate using the transfer unit, and the carrier layer is detached from the transfer section. The substrate is then inverted using the substrate rotator. At least a portion of a second surface of the substrate that is opposite the first surface is then heated using the transfer unit without transferring the transfer layer to the portion of the second surface.

In some embodiments, the heating of at least a portion of the second surface of the substrate includes heating with the transfer unit at least the portion of the second surface of the substrate through at least a portion of the carrier layer. In some embodiments, the process includes removing a portion of the transfer layer from a portion of the carrier layer using the transfer unit before heating at least a portion of the second portion of the substrate. In some embodiments, the transfer section includes the portion of the transfer layer.

In some embodiments of the transfer lamination process, the transfer layer is divided into a plurality of transfer panels, wherein each of a plurality of gaps in the transfer layer separates a pair of adjacent transfer panels. In some embodiments, the process step of heating at least a portion of the second surface of the substrate comprises heating with the transfer unit the portion of the second surface of the substrate through the carrier layer and one of the gaps in the transfer layer. In some embodiments, each transfer panel is separated from an adjacent transfer panel along a longitudinal axis of the carrier layer by one of the gaps. In some embodiments, the heating of the portion of the second surface of the substrate through the carrier layer and one of the gaps in the transfer layer comprises aligning one of the gaps in the transfer layer with the portion of the second surface of the substrate in the transfer unit.

In some embodiments of the transfer lamination process, an image is printed to a surface of the transfer section before transferring the transfer section.

In some embodiments, the transfer unit includes a heated transfer roller, and heating at least a portion of a second surface of the substrate comprises heating at least a portion of the second surface of the substrate using the heated transfer roller.

In some embodiments, the transfer of the transfer section comprises feeding the substrate along a processing path using a transport mechanism of the transfer lamination device. In some embodiments, the rotation of the substrate using the substrate rotator comprises feeding the substrate from the transfer unit to the substrate rotator using the transport mechanism. In some embodiments, the heating of at least a portion of the second surface of the substrate comprises feeding the substrate from the substrate rotator to the transfer unit using the transport mechanism.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices. Such computer readable media and memory for computer programs and software do not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Figure 1:
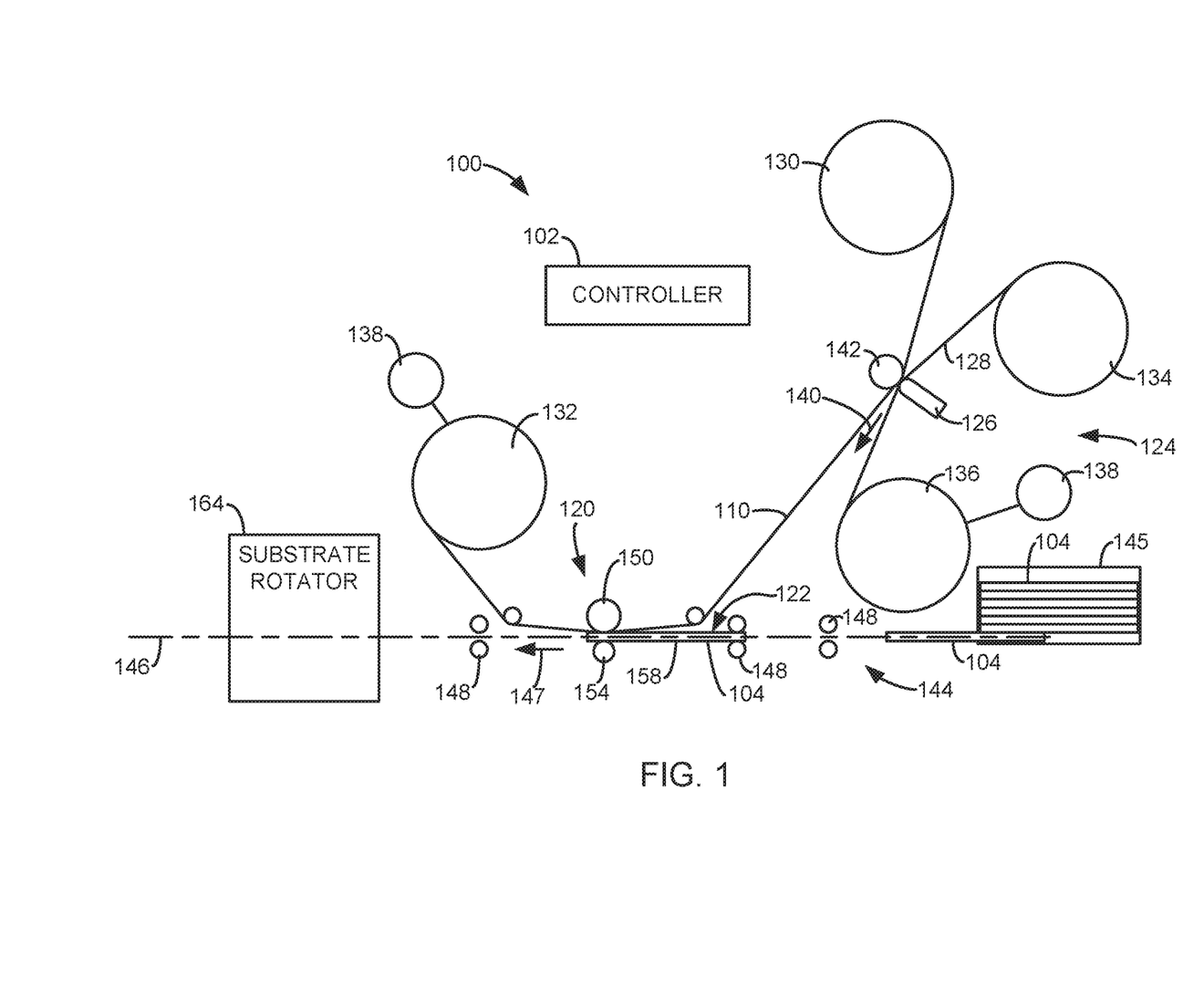
FIG. 1 is a simplified side view of an exemplary transfer lamination device in accordance with embodiments of the invention.

FIG. 1 is a simplified side view of an exemplary transfer lamination device 100 in accordance with embodiments of the invention. Motors, gears, circuitry and other conventional components may not be depicted in FIG. 1 in order to simplify the illustration.

In some embodiments, the device 100 includes a controller 102, which comprises at least one processor. In some embodiments, the controller 102 uses the at least one processor to execute program instructions stored in memory of the controller 102 or other memory, to control components of the device 100 to perform functions and method steps described herein to process a substrate 104. In some embodiments, the controller 102 controls components of the device 100 to perform a transfer lamination process on a substrate 104 using an intermediate transfer film or transfer ribbon.

The substrate 104 may take on many different forms, as understood by those skilled in the art. In some embodiments, the device 100 is in the form of a credential manufacturing device configured to produce credentials, such as driver's licenses, by processing a substrate 104 using the methods described herein. In some embodiments, the substrate 104 is a card substrate. In some embodiments, the card substrate 104 is a credential substrate that is used to form a credential, such as an identification card, a membership card, a proximity card, a driver's license, a passport, a credit card, a debit card, and other credentials or similar products. Exemplary card substrates include paper substrates other than traditional paper sheets used in copiers or paper sheet printers, plastic substrates, rigid and semi-rigid card substrates and other similar substrates.

Figure 2:
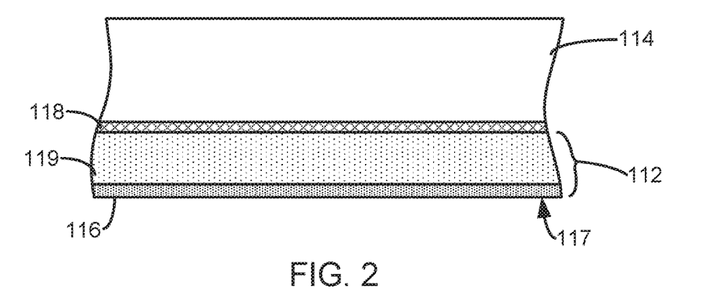
FIG. 2 is a simplified side cross-sectional view of an exemplary transfer ribbon in accordance with embodiments of the invention.

FIG. 2 is a simplified side cross-sectional view of an exemplary intermediate transfer film or transfer ribbon 110 in accordance with embodiments of the invention. In some embodiments, the transfer ribbon 110 includes a transfer layer 112 that is attached to a backing or carrier layer 114. A transfer section of the transfer layer 112 is transferred to a surface of the substrate 104 during the transfer lamination process.

In some embodiments, the transfer layer 112 is in the form of a fracturable laminate or thin film laminate. In some embodiments, the transfer layer 112 includes an image receptive layer 116 that is configured to receive an image on the surface 117. The image may be printed to the surface 117 in accordance with conventional techniques, such as through dye sublimation or inkjet printing processes.

The transfer ribbon 110 may include other conventional layers or materials that are not shown in order to simplify the illustration. These include a thermal adhesive in the image receptive layer 116, or a thermal adhesive layer on the image receptive layer 116. The thermal adhesive is activated during a transfer lamination process to bond the transfer layer 112 to a substrate.

The transfer ribbon 110 may also include a release layer 118 between the transfer layer 112 and the carrier layer 114. The release layer simplifies the release of the transfer layer 112 from the carrier layer 114 during a transfer lamination process.

In some embodiments, the transfer layer 112 includes a protective layer 119 located between the image receptive layer 116 and the carrier layer 114. Alternatively, the protective layer 119 may be combined with the image receptive layer 116. In some embodiments, the protective layer 119 includes one or more resins. The protective layer 119 operates to provide protection to the surface on which the transfer layer 112 is laminated. The protective layer 119 will also protect an image printed on or in the image receptive layer 116 when the transfer layer 112 is laminated to the substrate.

Figure 3:
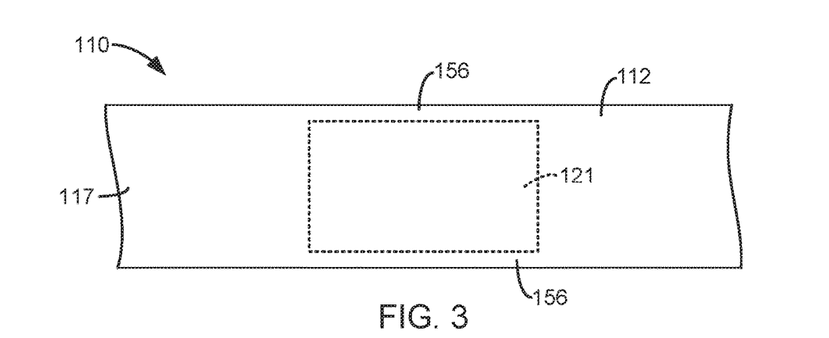
FIG. 3 is a simplified top plan view of an exemplary transfer ribbon illustrating a transfer section of a transfer layer in phantom lines.

In some embodiments, the device 100 includes a transfer unit 120, which is configured to transfer a portion (i.e., a transfer section) of the transfer layer 112 to a surface 122 of the substrate 104. FIG. 3 is a simplified top plan view of an exemplary transfer ribbon 110 illustrating a transfer section 121 of the transfer layer 112 in phantom lines. The transfer section 121 generally conforms to the surface of the substrate 104, to which it is transferred using the unit 120. Transfer operations in accordance with embodiments of the invention using the transfer unit 120 will be described in greater detail below.

In some embodiments, the device 100 includes a print unit 124, which is configured to print an image to the surface 117 of the image receptive layer 116 of the transfer section of the transfer layer 112, before it is transferred to the surface 122 of the substrate 104 using the transfer unit 120. In some embodiments, the print unit 124 includes a conventional thermal print head 126 comprising a plurality of heating elements that may be individually activated. In some embodiments, the print unit 124 includes a conventional thermal print ribbon 128, which may comprise a plurality of conventional print panels, such as colored dye panels, black resin panels, and/or other conventional print panels. In some embodiments, the transfer ribbon 110 is supported between a supply spool 130 and a take-up spool 132, and the print ribbon 128 is supported between a supply spool 134 and a take-up spool 136. In some embodiments, the device 100 includes one or more motors 138 that are configured to drive rotation of the take-up spools 132 and 136 to feed the transfer ribbon 110 and the print ribbon 128 in a feed direction indicated by arrow 140, in accordance with conventional techniques. Other motors may be used to drive rotation of the supply spools 130 and 134 to reverse the feeding of the transfer ribbon 110 and the print ribbon 128.

In some embodiments, the controller 102 controls the motors 138 to align a desired print panel of the print ribbon 128 with a transfer section 121 of the transfer layer 112 and the print unit 124 before initiating a print operation. In some embodiments, this alignment process is facilitated using sensors to detect markings (not shown) on the print ribbon 128 and/or the transfer ribbon 110. In some embodiments, a conventional mechanism drives the print head 126 to press the print ribbon 128 against the surface 117 of the transfer layer 112 under the support of a platen roller 142, as shown in FIG. 1. The heating elements of the print head 126 are then individually activated and deactivated as the print ribbon 128 and the transfer ribbon 110 are fed in the direction 140. This process may be repeated multiple times using different print panels of the print ribbon 128 to produce the desired image on or in the surface 117 of the image receptive layer 116 of the transfer section 121, in accordance with conventional techniques.

In a transfer operation, the transfer section 121, which may or may not include a printed image, is transferred to the surface 122 of the substrate 104 using the transfer unit 120. In some embodiments, the device 100 includes a conventional transport mechanism 144 and a substrate supply 145 (e.g., hopper or cartridge) that contains a plurality of the substrates 104. In some embodiments, the controller 102 controls the transport mechanism 144 to feed individual substrates 104 from the supply 145 along a processing path 146 in a feed direction 147. In some embodiments, the transport mechanism 144 includes motorized rollers 148, such as pinch roller pairs, or other conventional components to feed the cards 104 along the path 146.

In some embodiments, the transfer lamination process begins with a conventional alignment process, in which a desired transfer section 121 of the transfer layer 112 is aligned with a substrate 104 that is presented to the transfer unit 120 along the processing path 146. In some embodiments, the controller 102 controls the feeding of the transfer ribbon 110 using the motor 138, and the feeding of the substrate 104 along the path 146 using the transport mechanism 144, to align the transfer section of the transfer layer 112 with the substrate 104 and complete the alignment process. Sensors may also be used to detect the location of the transfer section 121 and the substrate 104 in accordance with conventional transfer lamination processes.

Figure 4:
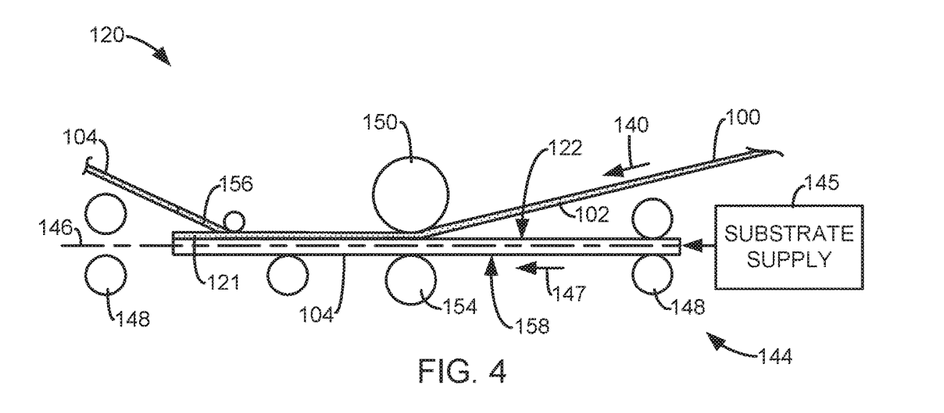
FIG. 4 is a simplified side view of a transfer unit performing a transfer lamination operation in accordance with embodiments of the invention.

In some embodiments, the transfer unit 120 includes a heated transfer roller 150 that is configured to transfer the transfer section 121 to the surface 122 of the substrate 104, with which it has been aligned, as shown in the simplified side view of the transfer unit 120 provided in FIG. 4. During the transfer lamination operation, the transfer roller 150 presses the transfer section 121 against the surface 122 of the credential substrate 104, which is supported on a platen roller 154, and heats the transfer section 121 including the adhesive of the transfer layer 112 to bond the transfer section 121 to the surface 122 of the substrate 104. As the substrate 104 and the transfer ribbon 110 are fed past the transfer roller 150, the carrier layer 114 is pulled from the transfer section 121 that has bonded to the surface 122. Portions of the transfer layer 112 that do not bond to the surface 122, such as portions 156 (FIG. 3) on the sides of the transfer section 121, remain adhered to the carrier layer 114.

After the transfer section 121 has been transferred from the ribbon 110 to the surface 122 of the substrate 104, the substrate 104 tends to bend as it cools due to the contraction of the surface 122 and/or the transfer section 121, for example. As a result, the substrate 104 becomes warped (e.g., the surface 122 becomes concave) following the transfer lamination process.

Embodiments of the invention are directed to reducing warpage of the substrate 104 following a transfer lamination process on the surface 122. In some embodiments, warpage of the substrate 104 caused by the transfer lamination process performed on the surface 122 is reduced through the performance of a heating operation on a surface 158 (FIG. 4), which is opposite the surface 122, using the transfer unit 120. At least a portion of this heating of the surface 158 is performed without transferring the transfer layer 112 to the surface 158. This heating of the surface 158 reduces the bend or warpage of the substrate 104.

Figure 5:
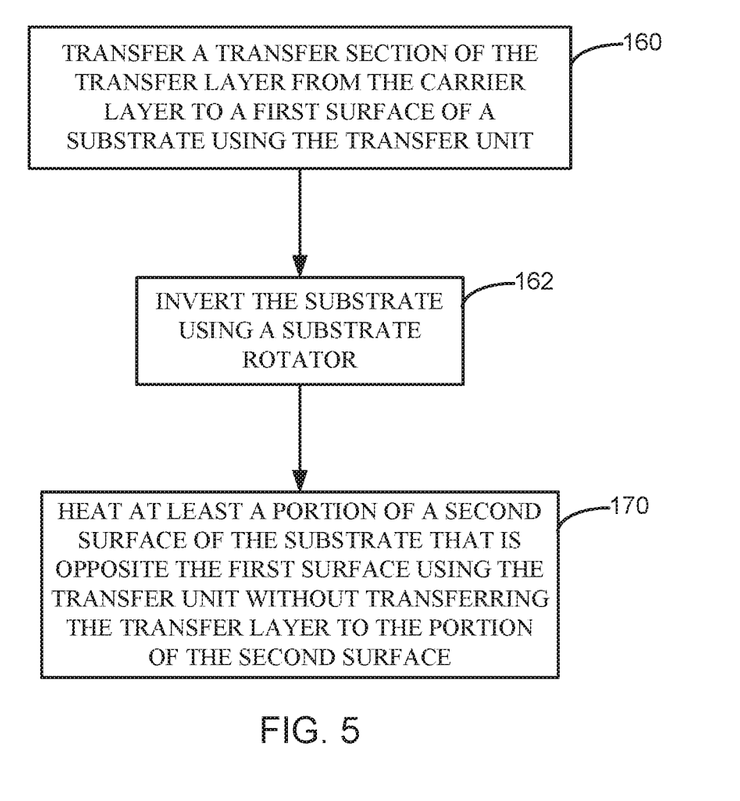
FIG. 5 is a flowchart illustrating a transfer lamination process in accordance with embodiments of the invention.

FIG. 5 is a flowchart illustrating a transfer lamination process in accordance with embodiments of the invention. At 160 of the process, a transfer section 121 of the transfer layer 112 is transferred from the carrier layer 114 to a first surface 122 of a substrate 104 using the transfer unit 120. In some embodiments, step 160 is performed in accordance with the transfer lamination process described above with reference to FIG. 4. In some embodiments of step 160, the transfer section 121 is heated and pressed against the surface 122 of the substrate 104 using the transfer roller 150 of the transfer unit 120, then the carrier layer 114 is detached from the transfer section 121, as shown in FIG. 4.

At 162 of process, the substrate 104 is inverted using a substrate rotator 164. In some embodiments, the substrate rotator 164 is in line with the processing path 146, as shown in FIG. 1. The substrate rotator 164 may be a conventional substrate rotator that is configured to invert individual substrates 104 that are received by the substrate rotator 164 along the processing path 146. Exemplary substrate rotators that are suitable for use as the substrate rotator 164 are described in U.S. Pat. Nos. 6,279,901, 7,878,505 and 8,646,770, each of which are hereby incorporated by reference in their entirety.

Figure 6A:
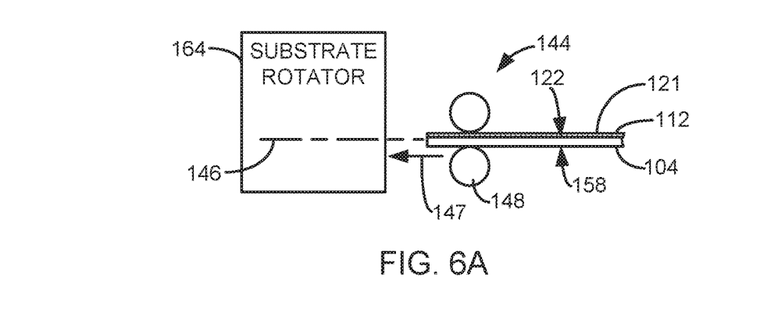
FIGS. 6A and 6B are simplified side views illustrating a process step in accordance with embodiments of the invention
Figure 6B:
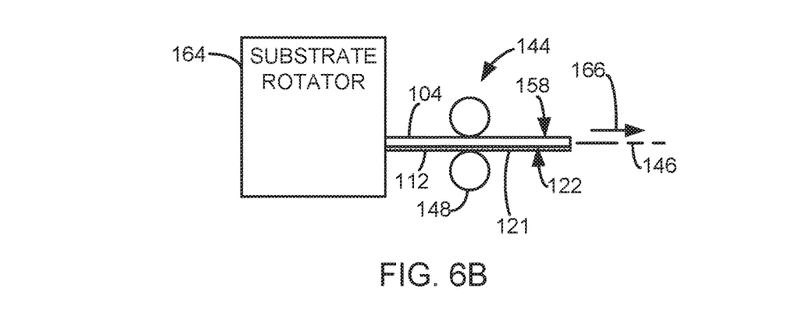

FIGS. 6A and 6B are simplified side views illustrating the process step 162 in accordance with embodiments of the invention. In some embodiments, the substrate 104 that was processed in step 160 is fed along the processing path 146 in the direction 147 to the substrate rotator 164 using the transport mechanism 144. The substrate rotator 164 receives the substrate 104, inverts the substrate 104, and returns the substrate to the transport mechanism 144 for feeding in the direction 166 along the processing path 146 to the transfer unit 120, as shown in FIG. 6B. The inversion of the substrate 104 by the substrate rotator 164 orients the substrate 104 such that the surface 158, which is opposite the surface 122, is positioned to face the transfer roller 150. In some embodiments, the substrate 104 is fed in the direction 166 past the transfer roller 150 to position the substrate 104 for processing by the transfer unit 120.

Figure 7:
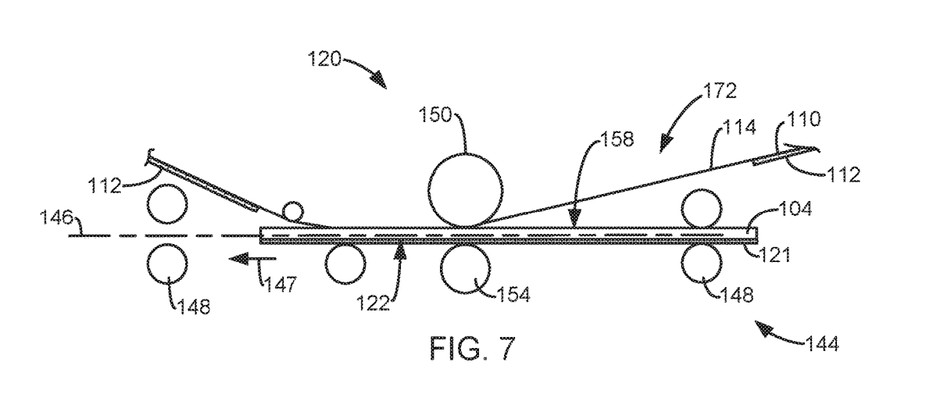
FIG. 7 is a simplified side view of a heating operation performed using a transfer unit in accordance with embodiments of the invention.

At 170 of the method, at least a portion of the second surface 158 of the substrate 104 is heated using the transfer unit 120 without transferring the transfer layer 112 from the ribbon 110 to the portion of the surface 158. This is generally illustrated in FIG. 7, which is a simplified side view of the transfer unit 120 performing the heating operation 170 in accordance with embodiments of the invention. The heating operation 170 generally involves heating the portion of the surface 158 through at least a portion of the carrier layer 114 using the transfer unit 120. In some embodiments, the heating step 170 involves heating at least a portion of the second surface 158 of the substrate and/or the ribbon 110 to a temperature that is below the activation temperature of the transfer layer 112 to prevent portions of the transfer layer 112 from transferring to the surface 158. As used herein, the activation temperature of the transfer layer 112 is the temperature at which the bond between the transfer layer 112 and the carrier layer 114 (e.g., the bond between the release layer 118 and the layers 112 and 114) is overcome by the bond between the transfer layer 112 and a substrate engaging the transfer layer 112 during a transfer lamination process using the transfer unit. That is only portions of the transfer layer 112 that are heated to the activation temperature are transferred to the engaging surface of a substrate during a transfer lamination process. In some embodiments, the activation temperature is approximately 140° C. In some embodiments of step 170, the transfer unit 120 is heated to a temperature that is less than the activation temperature to ensure that the transfer layer 112 is not transferred to the surface 158, such as 130° C., for example.

In some embodiments of step 170, the surface 158 of the substrate 104 is aligned with a section 172 of the transfer ribbon 110 that does not include the transfer layer 112, as shown in FIG. 7. In some embodiments, at least a portion of the transfer layer 112 is removed from the section 172 of the transfer ribbon 110 during a transfer operation. That is, at least a portion of the transfer layer 112 within the section 172 is removed in a transfer lamination process, during which the transfer layer 112 or a portion thereof within the section 172 is transferred to a substrate 104. In accordance with this embodiment, section 172 of the ribbon 110 may include portions of transfer layer 112, such as side portions 156 (FIG. 3), on the carrier layer 114. These portions are not shown in FIG. 7 in order to simplify the illustration.

In some embodiments, the transfer layer 112, or a portion thereof, within the section 172 is removed during step 160 of the method. Thus, the transfer section 121 transferred to the surface 122 of the substrate 104 in step 160 was located in the section 172 of the ribbon 110. In other embodiments, the gap in the transfer layer 112 within the section 172 of the ribbon 110 is formed during a previous transfer operation during which a transfer section 121 of the layer 112 within the section 172 is transferred to a substrate 104 that is different from the substrate 104 processed in step 160.

As mentioned above, in some embodiments, at least a portion of the surface 158 of the substrate 104 is heated using the transfer roller 150 of the transfer unit 120 through a portion of the carrier layer 114 within the section 172 of the ribbon 100. In some embodiments, heat from the transfer roller 150 travels along a path through the carrier layer 114 of the section 172 to the portion of the surface 158 without traveling through a portion of the transfer layer 112. In some embodiments, the portion of the surface 158 that is heated in step 170 is not placed in direct contact with a portion of the transfer layer 112 that is attached to the carrier layer 114. As a result, the portion of the surface 158 of the substrate 104 is heated without transferring any transfer layer 112 from the carrier layer 114 to the portion of the surface 158.

In order to avoid inadvertent transfer of a portion of the transfer layer 112 from the carrier layer 114 to the surface 158, it is necessary to align the substrate 104 with the gap in the transfer layer 112 within the section 172 of the ribbon 110. This alignment process may be accomplished using conventional techniques, which may involve, for example, detecting alignment markings on the transfer ribbon 110, detecting the leading edge of the substrate 104, and feeding the substrate 104 and the transfer ribbon 110 relative to the transfer unit 120 or transfer roller 150. When the substrate 104 is properly aligned with the gap in the transfer layer 112, the entire surface 158 may be heated through the carrier layer 114 corresponding to the gap without transferring any transfer layer 112 to the surface 158.

Figure 8:
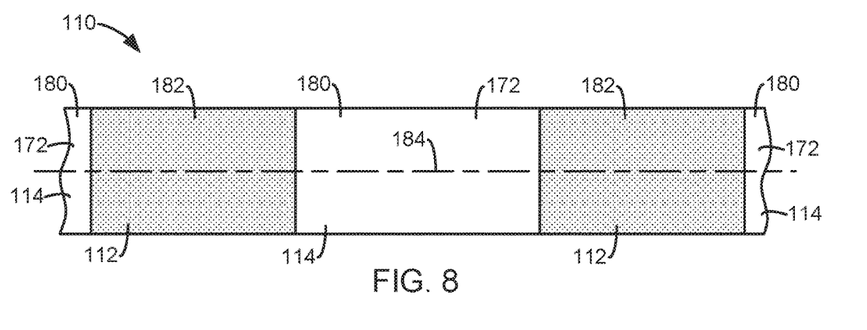
FIGS. 8 and 9 are simplified top plan views of transfer ribbons formed in accordance with embodiments of the invention.
Figure 9:
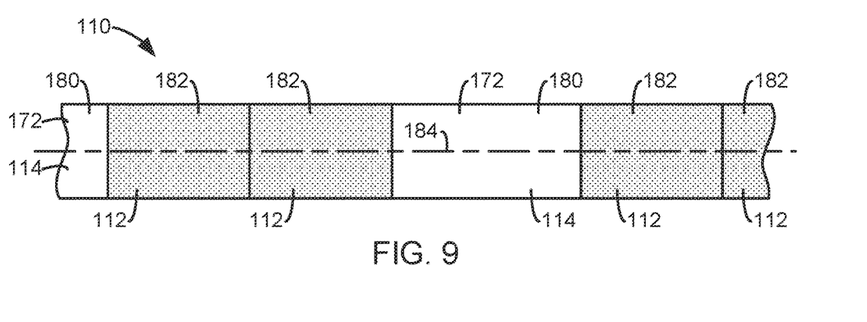
Figure 10:
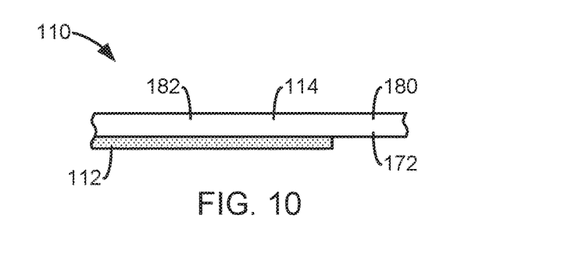
FIG. 10 is a simplified side view of a portion of the ribbons shown in FIGS. 8 and 9.

FIGS. 8 and 9 are simplified top plan views of transfer ribbons 110 formed in accordance with embodiments of the invention. While conventional transfer ribbons 110 are manufactured to include a continuous transfer layer 112, the transfer ribbons 110 of FIGS. 8 and 9 are manufactured to include pre-defined sections 172 having gaps 180 formed between transfer panels 182. In some embodiments, the transfer layer 112 of a transfer panel 182 extends to the gap 180, which does not include the transfer layer 112, as shown in the simplified side view provided in FIG. 10. Thus, the ribbons 110 of FIGS. 8 and 9 are each manufactured to include the gaps 180 in the transfer layer 112, and do not require the formation of the gaps 180 through transfer lamination processes performed using the device 100. It should be understood that the outlines of the transfer panels 182 provided in FIGS. 8 and 9 are merely shown to illustrate the feature and do not represent actual lines on the transfer ribbon 110.

In some embodiments, each of gaps 180 are preferably formed larger in length and/or width than that of the surface 158 of the substrates 104. This decreases the precision that is required in aligning the gaps 180 to the surface 158 during the heating process 170. As a result, it is less likely that a portion of the transfer layer 112 will be transferred to the surface 158 during the heating operation 170 using the transfer ribbons 110 of FIGS. 8 and 9.

In some embodiments, each of the transfer panels 182 is separated from an adjacent transfer panel 182 along a longitudinal axis 184 of the carrier layer 114 by one of the gaps 180, as shown in FIG. 8. That is, in some embodiments, the transfer panels 182 and the gaps 180 alternate along the length of the ribbon 110.

In some embodiments, each of the gaps 180 separates a pair of adjacent transfer panels 182, as shown in FIGS. 8 and 9. In some embodiments, there are fewer gaps 180 than there are transfer panels 182. In some embodiments, the transfer ribbon 110 includes a plurality of adjoining panels 182 that are not separated by a gap 180, as shown in FIG. 9.

In some embodiments of the invention, the transfer lamination process described above with reference to FIG. 5 is performed using one of the transfer ribbons 110 of FIG. 8 or 9. Thus, in step 160, a transfer section of the transfer layer 112 from one of the transfer panels is transferred to the surface 122 of the substrate 104, in the manner described with reference to FIG. 4. As described above, in some embodiments, step 160 is performed after an image is printed to a surface of the transfer section. Step 162 of the method is performed in accordance with one or more embodiments described above to invert the substrate 104, as shown in FIGS. 6A and 6B. After the inverted substrate 104 travels in the direction along the processing path 146 for processing by the transfer unit 120, one of the sections 172 having a gap 180 is aligned with the surface 158, and the heating step 170 is performed in accordance with one or more embodiments described above with reference to FIG. 7. In some embodiments, the entire surface 158 of the substrate 104 is heated through the carrier layer 114 in step 170 using the transfer unit 120 or transfer roller 150 without transferring a portion of the transfer layer 112 from the ribbon 100 to the surface 158. This heating of the surface 158 reduces the bend formed in the substrate 104 during the transfer step 160.

Although the present invention has been described with reference to preferred embodiments, workers skilled in the art will recognize that changes may be made in form and detail without departing from the spirit and scope of the invention.

What is claimed is:

1. A transfer lamination process using a transfer lamination device, which includes a transfer unit, a substrate rotator, and a transfer ribbon that includes a carrier layer and a transfer layer attached to the carrier layer, the transfer lamination process comprising:
   transferring a transfer section of the transfer layer from the carrier layer to a first surface of a substrate using the transfer unit including:
      heating the transfer section and pressing the transfer section against the first surface of the substrate using the transfer unit; and
      detaching the carrier layer from the transfer section;
   inverting the substrate using the substrate rotator; and
   heating at least a portion of a second surface of the substrate that is opposite the first surface using the transfer unit without transferring the transfer layer to the portion of the second surface;
   wherein:
      the transfer unit includes a heated transfer roller; and
      heating the portion of the second surface of the substrate comprises heating the portion of the second surface of the substrate using the heated transfer roller.

2. The transfer lamination process according to claim 1, wherein heating at least a portion of a second surface of the substrate comprises heating with the heated transfer roller at least the portion of the second surface of the substrate through at least a portion of the carrier layer.

3. The transfer lamination process according to claim 2, further comprising removing a portion of the transfer layer from the transfer layer that is attached to the carrier layer and the portion of the carrier layer using the transfer unit before heating at least a portion of a second surface of the substrate.

4. The transfer lamination process according to claim 3, wherein the transfer section includes the portion of the transfer layer.

5. The transfer lamination process according to claim 1, wherein:
the transfer layer is divided into a plurality of transfer panels, wherein each of a plurality of gaps in the transfer layer separates a pair of adjacent transfer panels; and
heating at least a portion of a second surface of the substrate comprises heating with the transfer unit the portion of the second surface of the substrate through the carrier layer and one of the gaps in the transfer layer.

6. The transfer lamination process according to claim 5, wherein each transfer panel is separated from an adjacent transfer panel along a longitudinal axis of the carrier layer by one of the gaps.

7. The transfer lamination process according to claim 5, wherein heating with the transfer unit the portion of the second surface of the substrate through the carrier layer and one of the gaps in the transfer layer comprises aligning one of the gaps in the transfer layer with the portion of the second surface of the substrate and the transfer unit.

8. The transfer lamination process according to claim 2, wherein heating at least a portion of a second surface of the substrate comprises heating with the transfer unit at a temperature below the activation temperature of the transfer layer.

9. The transfer lamination process according to claim 1, further comprising printing an image to a surface of the transfer section before transferring a transfer section.

10. The transfer lamination process according to claim 1, wherein:
transferring a transfer section comprises feeding the substrate along a processing path using a transport mechanism of the transfer lamination device;
rotating the substrate using the substrate rotator comprises feeding the substrate from the transfer unit to the substrate rotator using the transport mechanism; and
heating at least a portion of a second surface of the substrate comprises feeding the substrate from the substrate rotator to the transfer unit using the transport mechanism.

11. The transfer lamination process according to claim 10, wherein the substrate comprises a card substrate.

12. A transfer lamination process using a transfer lamination device, which includes a transfer unit, a substrate rotator, and a transfer ribbon, the transfer ribbon includes a carrier layer and a transfer layer attached to the carrier layer, the transfer layer is divided into a plurality of transfer panels, and each of a plurality of gaps in the transfer layer separates a pair of adjacent transfer panels, the transfer lamination process comprising:
transferring a transfer section of the transfer layer of one of the transfer panels from the carrier layer to a first surface of a substrate using the transfer unit including:
heating the transfer section and pressing the transfer section against the first surface of the substrate using a heated transfer roller of the transfer unit; and
detaching the carrier layer from the transfer section;
inverting the substrate using the substrate rotator; and
heating the second surface of the substrate that is opposite the first surface through the carrier layer and one of the gaps in the transfer layer using the heated transfer roller of the transfer unit.

13. The transfer lamination process according to claim 12, further comprising printing an image to a surface of the transfer section before transferring a transfer section.

14. A transfer ribbon for use in a transfer lamination process comprising:
a carrier layer; and
a plurality of transfer panels each comprising a fracturable transfer layer attached to the carrier layer;
wherein each of a plurality of gaps in the transfer layer separates a pair of adjacent transfer panels along a longitudinal axis of the carrier layer.

15. The transfer ribbon according to claim 14, wherein the fracturable transfer layer of each transfer section is configured to fracture during a transfer lamination operation on a substrate between a transfer section of the transfer layer that is bonded to the substrate, and a portion of the transfer layer that adjoins the transfer section and remains adhered to the carrier layer after the carrier layer is detached from the transfer section.

16. The transfer lamination processes according to claim 1, wherein heating the transfer section and pressing the transfer section against the first surface of the substrate comprises heating the transfer section and pressing the transfer section against the first surface of the substrate using the heated transfer roller of the transfer unit.

17. The transfer lamination processes according to claim 16, wherein:
a portion of the transfer layer adjoins the transfer section on the carrier layer during heating the transfer section and pressing the transfer section against the first surface of the substrate; and
the portion of the transfer layer remains adhered to the carrier layer after detaching the carrier layer from the transfer section.

18. The transfer lamination process according to claim 1, wherein heating the portion of the second surface of the substrate using the heated transfer roller includes:
feeding the substrate in a feed direction; and
pressing the heated transfer roller against the second surface over an entire length of the substrate, which is oriented in the feed direction.

19. The transfer lamination processes according to claim 12, wherein:
a portion of the transfer layer adjoins the transfer section on the carrier layer during heating the transfer section and pressing the transfer section against the first surface of the substrate; and
the portion of the transfer layer remains adhered to the carrier layer after detaching the carrier layer from the transfer section.

* * * * *